US011320537B2

(12) United States Patent
Kimura

(10) Patent No.: US 11,320,537 B2
(45) Date of Patent: May 3, 2022

(54) ENHANCING TRIANGULATION-BASED THREE-DIMENSIONAL DISTANCE MEASUREMENTS WITH TIME OF FLIGHT INFORMATION

(71) Applicant: Magik Eye Inc., New York, NY (US)

(72) Inventor: Akiteru Kimura, Hachioji (JP)

(73) Assignee: Magik Eye Inc., New York, NY (US)

( * ) Notice: Subject to any disclaimer, the term of this patent is extended or adjusted under 35 U.S.C. 154(b) by 5 days.

(21) Appl. No.: 17/104,160

(22) Filed: Nov. 25, 2020

(65) Prior Publication Data

US 2021/0165098 A1    Jun. 3, 2021

Related U.S. Application Data

(60) Provisional application No. 62/942,137, filed on Dec. 1, 2019.

(51) Int. Cl.
| | |
|---|---|
| *G01S 17/48* | (2006.01) |
| *G01S 7/4865* | (2020.01) |
| *G01S 17/894* | (2020.01) |
| *G01B 11/02* | (2006.01) |

(52) U.S. Cl.
CPC ............ *G01S 17/48* (2013.01); *G01B 11/026* (2013.01); *G01S 7/4865* (2013.01); *G01S 17/894* (2020.01)

(58) Field of Classification Search
CPC ...... G01S 17/48; G01S 17/894; G01S 7/4865; G01B 11/026
See application file for complete search history.

(56) References Cited

U.S. PATENT DOCUMENTS

| | | | |
|---|---|---|---|
| 4,914,460 | A | 4/1990 | Caimi et al. |
| 5,061,062 | A | 10/1991 | Schneiter |
| 5,699,444 | A | 12/1997 | Palm |
| 5,730,702 | A | 3/1998 | Tanaka et al. |

(Continued)

FOREIGN PATENT DOCUMENTS

| | | |
|---|---|---|
| CN | 101794065 A | 8/2010 |
| CN | 103428026 A | 4/2013 |

(Continued)

OTHER PUBLICATIONS

International Search Report and Written Opinion mailed in corresponding PCT/US2020/062138 dated Mar. 9, 2021, 8 pages.

*Primary Examiner* — Thanh Luu
(74) *Attorney, Agent, or Firm* — Tong, Rea, Bentley & Kim, LLC

(57) ABSTRACT

An example method includes causing a distance sensor to project a pattern of light onto an object, causing the distance sensor to acquire an image of the pattern of light on the object, detecting an image position of a first point of light of the pattern on an imaging sensor, calculating a first estimated distance and a second estimated distance between the distance sensor and the object, based on the image position, causing the distance sensor to emit a pulse of light toward the object, causing the distance sensor to acquire an image of a reflected portion of the pulse of light, calculating a third estimated distance between the distance sensor and the object, based on a time of flight of the pulse, and calculating a fourth estimated distance between the distance sensor and the object, based on the first estimated distance, second estimated distance, and third estimated distance.

20 Claims, 6 Drawing Sheets

(56) References Cited

U.S. PATENT DOCUMENTS

| | | |
|---|---|---|
| 5,870,136 A | 2/1999 | Fuchs et al. |
| 5,980,454 A | 11/1999 | Broome |
| 6,038,415 A | 3/2000 | Nishi et al. |
| 6,442,476 B1 | 8/2002 | Poropat |
| 6,668,082 B1 | 12/2003 | Davison et al. |
| 6,937,350 B2 | 8/2005 | Shirley |
| 7,191,056 B2 | 3/2007 | Costello et al. |
| 7,193,645 B1 | 3/2007 | Aagaard et al. |
| 7,375,803 B1 | 5/2008 | Bamji |
| 7,589,825 B2 | 9/2009 | Orchard et al. |
| 9,098,909 B2 | 8/2015 | Nomura |
| 9,488,757 B2 | 11/2016 | Mukawa |
| 9,536,339 B1 | 1/2017 | Worley et al. |
| 9,686,539 B1 | 6/2017 | Zuliani et al. |
| 9,888,225 B2 | 2/2018 | Znamensky et al. |
| 9,986,208 B2 | 5/2018 | Chao et al. |
| 10,223,793 B1 | 3/2019 | Ebrahimi et al. |
| 2003/0071891 A1 | 4/2003 | Geng |
| 2004/0167744 A1 | 8/2004 | Lin et al. |
| 2005/0288956 A1 | 12/2005 | Speicher |
| 2006/0044546 A1 | 3/2006 | Lewin et al. |
| 2006/0055942 A1 | 3/2006 | Krattiger |
| 2006/0290781 A1 | 12/2006 | Hama |
| 2007/0091174 A1 | 4/2007 | Kochi et al. |
| 2007/0165243 A1 | 7/2007 | Kang et al. |
| 2007/0206099 A1 | 9/2007 | Matsuo |
| 2008/0259354 A1 | 10/2008 | Gharib |
| 2010/0007719 A1 | 1/2010 | Frey et al. |
| 2010/0149315 A1 | 6/2010 | Qu et al. |
| 2010/0209002 A1 | 8/2010 | Thiel et al. |
| 2010/0223706 A1 | 9/2010 | Becker et al. |
| 2010/0238416 A1 | 9/2010 | Kuwata |
| 2010/0303341 A1 | 12/2010 | Hausler |
| 2011/0037849 A1 | 2/2011 | Niclass et al. |
| 2011/0188054 A1 | 8/2011 | Petronius et al. |
| 2012/0051588 A1 | 3/2012 | Mceldowney |
| 2012/0056982 A1 | 3/2012 | Katz et al. |
| 2012/0062758 A1 | 3/2012 | Devine et al. |
| 2012/0076375 A1 | 3/2012 | Saijo et al. |
| 2012/0105867 A1 | 5/2012 | Komatsu |
| 2012/0113252 A1 | 5/2012 | Yang et al. |
| 2012/0219699 A1 | 8/2012 | Pettersson |
| 2012/0225718 A1 | 9/2012 | Zhang |
| 2012/0236288 A1 | 9/2012 | Stanley |
| 2012/0236317 A1 | 9/2012 | Nomura |
| 2012/0307260 A1 | 12/2012 | Keshavmurthy |
| 2013/0038882 A1 | 2/2013 | Umeda et al. |
| 2013/0076865 A1 | 3/2013 | Tateno et al. |
| 2013/0088575 A1 | 4/2013 | Park et al. |
| 2013/0155417 A1 | 6/2013 | Ohsawa |
| 2013/0242090 A1 | 9/2013 | Yoshikawa |
| 2013/0307933 A1 | 11/2013 | Znamensky et al. |
| 2013/0314688 A1 | 11/2013 | Likholyot |
| 2014/0000520 A1 | 1/2014 | Bareket |
| 2014/0009571 A1 | 1/2014 | Geng |
| 2014/0016113 A1 | 1/2014 | Holt et al. |
| 2014/0036096 A1 | 2/2014 | Sterngren |
| 2014/0071239 A1 | 3/2014 | Yokota |
| 2014/0085429 A1 | 3/2014 | Hébert et al. |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0012244 A1 | 1/2015 | Oki |
| 2015/0062558 A1 | 3/2015 | Koppal et al. |
| 2015/0077764 A1 | 3/2015 | Braker et al. |
| 2015/0131054 A1 | 5/2015 | Wuellner et al. |
| 2015/0016003 A1 | 6/2015 | Terry et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2015/0323321 A1 | 11/2015 | Oumi |
| 2015/0336013 A1 | 11/2015 | Stenzier et al. |
| 2015/0347833 A1 | 12/2015 | Robinson |
| 2015/0381907 A1 | 12/2015 | Boetliger et al. |
| 2016/0022374 A1 | 1/2016 | Haider |
| 2016/0041266 A1 | 2/2016 | Smits |
| 2016/0050401 A1 | 2/2016 | Gordon |
| 2016/0117561 A1 | 4/2016 | Miyazawa et al. |
| 2016/0128553 A1 | 5/2016 | Geng |
| 2016/0157725 A1 | 6/2016 | Munoz |
| 2016/0178915 A1 | 6/2016 | Mor et al. |
| 2016/0249810 A1 | 9/2016 | Darty et al. |
| 2016/0261854 A1 | 9/2016 | Ryu et al. |
| 2016/0267682 A1 | 9/2016 | Yamashita |
| 2016/0288330 A1 | 10/2016 | Konolige |
| 2016/0327385 A1 | 11/2016 | Kimura |
| 2016/0328854 A1 | 11/2016 | Kimura |
| 2016/0334939 A1 | 11/2016 | Dawson et al. |
| 2016/0350594 A1 | 12/2016 | McDonald |
| 2016/0377414 A1 | 12/2016 | Thuries et al. |
| 2016/0379368 A1 | 12/2016 | Sakas et al. |
| 2017/0067734 A1 | 3/2017 | Heidemann |
| 2017/0098305 A1 | 4/2017 | Gossow |
| 2017/0102461 A1 | 4/2017 | Tezuka et al. |
| 2017/0221226 A1 | 8/2017 | Shen et al. |
| 2017/0270689 A1 | 9/2017 | Messely et al. |
| 2017/0284799 A1 | 10/2017 | Wexler et al. |
| 2017/0307544 A1 | 10/2017 | Nagata |
| 2017/0347086 A1 | 11/2017 | Watanabe |
| 2018/0010903 A1 | 1/2018 | Takao et al. |
| 2018/0011194 A1 | 1/2018 | Masuda et al. |
| 2018/0073863 A1 | 3/2018 | Watanabe |
| 2018/0080761 A1 | 3/2018 | Takao et al. |
| 2018/0143018 A1 | 5/2018 | Kimura |
| 2018/0156609 A1 | 6/2018 | Kimura |
| 2018/0227566 A1 | 8/2018 | Price et al. |
| 2018/0247424 A1* | 8/2018 | Bleyer ............ G01S 17/86 |
| 2018/0249142 A1 | 8/2018 | Hicks et al. |
| 2018/0324405 A1 | 11/2018 | Thirion |
| 2018/0329038 A1 | 11/2018 | Lin et al. |
| 2018/0357871 A1 | 12/2018 | Siminoff |
| 2019/0064359 A1 | 2/2019 | Yang |
| 2019/0107387 A1 | 4/2019 | Kimura |
| 2019/0108743 A1 | 4/2019 | Kimura |
| 2019/0122057 A1 | 4/2019 | Kimura |
| 2019/0295270 A1 | 9/2019 | Kimura |
| 2019/0297241 A1 | 9/2019 | Kimura |
| 2019/0297278 A1 | 9/2019 | Sumi et al. |
| 2019/0377088 A1 | 12/2019 | Kimura |
| 2020/0003556 A1 | 1/2020 | Kimura |
| 2020/0051268 A1 | 2/2020 | Kimura |
| 2020/0077010 A1 | 3/2020 | Noguchi |
| 2020/0090355 A1* | 3/2020 | Hall ............ G01S 17/32 |
| 2020/0092524 A1 | 3/2020 | Morris |
| 2020/0182974 A1 | 6/2020 | Kimura |
| 2020/0236315 A1 | 7/2020 | Kimura |
| 2020/0278197 A1 | 9/2020 | Tokimitsu |

FOREIGN PATENT DOCUMENTS

| | | |
|---|---|---|
| CN | 103196385 A | 7/2013 |
| CN | 103559735 A | 2/2014 |
| CN | 104160243 A | 11/2014 |
| CN | 104515514 A | 4/2015 |
| CN | 104685868 A | 6/2015 |
| CN | 106796179 A | 5/2017 |
| DE | 102016118562 A1 | 3/2017 |
| EP | 0358628 A2 | 3/1990 |
| EP | 1 739 391 A2 | 1/2007 |
| EP | 3 171 129 A1 | 5/2017 |
| JP | H4-51112 A | 2/1992 |
| JP | H9-61126 | 3/1997 |
| JP | 2002-056348 A | 2/2002 |
| JP | 4485365 B2 | 2/2006 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |

(56) References Cited

FOREIGN PATENT DOCUMENTS

| | | |
|---|---|---|
| JP | 2010-256182 A | 11/2010 |
| JP | 2012-047500 A | 3/2012 |
| JP | 2013-8513179 A | 4/2013 |
| JP | 2014-020978 A | 2/2014 |
| JP | 2014-044113 A | 3/2014 |
| JP | 2014-511590 A | 5/2014 |
| JP | 2014-122789 A | 7/2014 |
| JP | 2014-238259 A | 12/2014 |
| JP | 6038415 B1 | 12/2016 |
| JP | 6241793 B2 | 12/2017 |
| JP | 2018514783 A | 6/2018 |
| JP | 2019-203822 A | 11/2019 |
| KR | 10-2013-0000356 A | 1/2013 |
| KR | 10-2013-0037152 A | 4/2013 |
| KR | 10-2015-0101749 A | 9/2015 |
| KR | 10-2016-0020323 | 2/2016 |
| KR | 10-2017-0005649 A | 1/2017 |
| KR | 10-2017-0054221 A | 5/2017 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO 2013/0145164 | 10/2013 |
| WO | WO 2014/0106843 A2 | 7/2014 |
| WO | WO 2014/131064 | 8/2014 |
| WO | WO 2015/166915 A1 | 11/2015 |
| WO | WO 2017/053368 A1 | 3/2017 |

\* cited by examiner

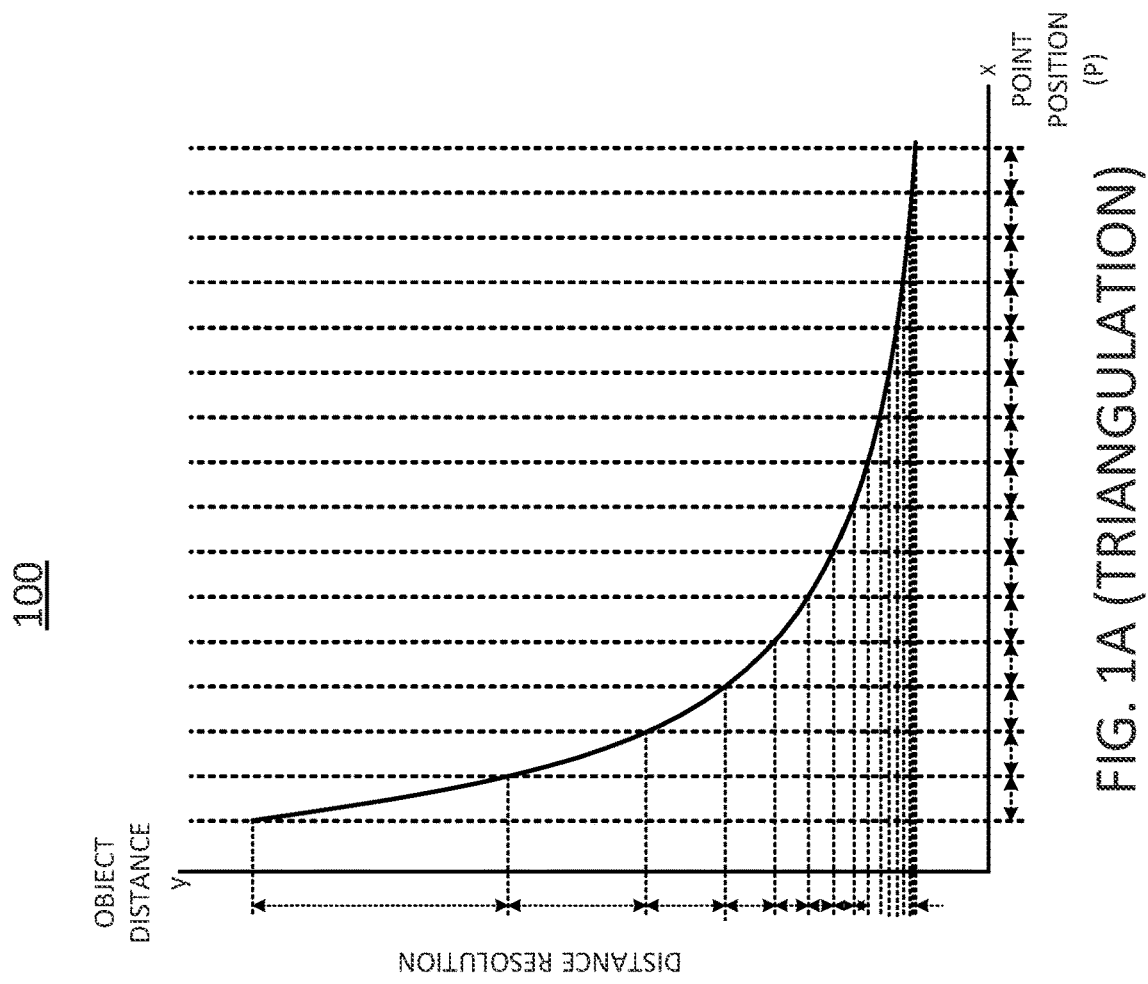
FIG. 1A (TRIANGULATION)
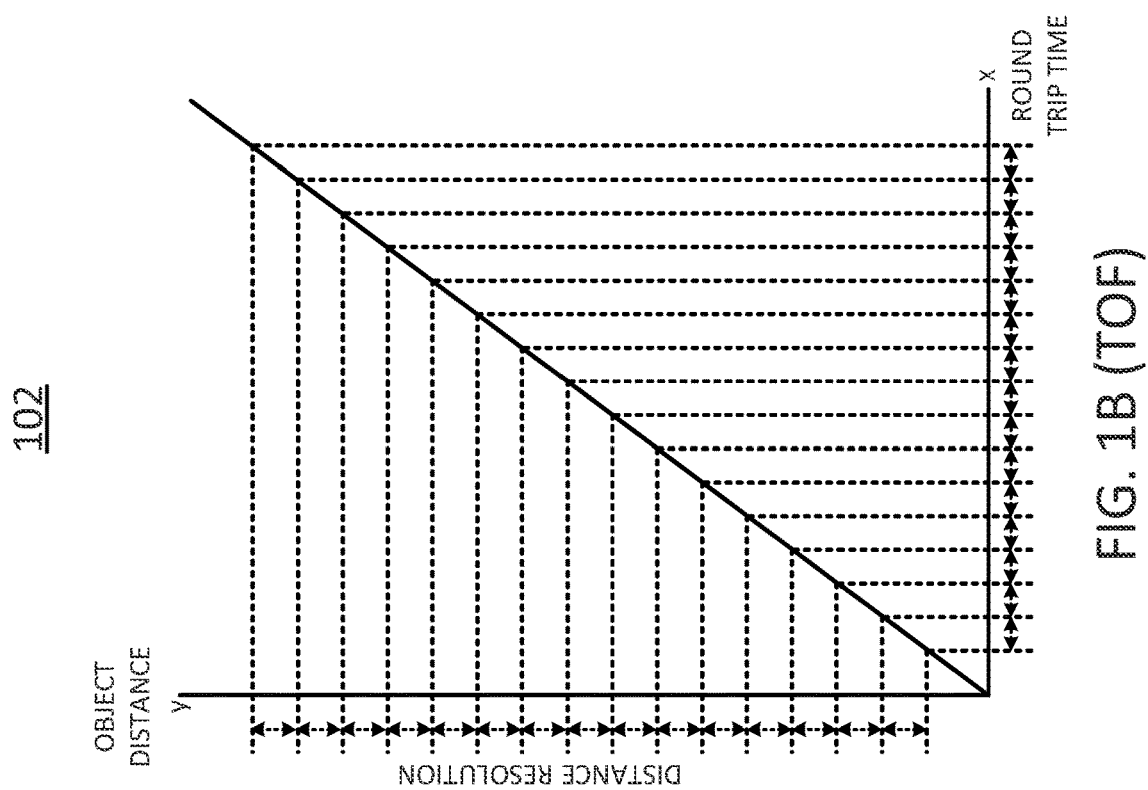
FIG. 1B (TOF)

ENHANCING TRIANGULATION-BASED THREE-DIMENSIONAL DISTANCE MEASUREMENTS WITH TIME OF FLIGHT INFORMATION

CROSS REFERENCE TO RELATED APPLICATIONS

This application claims the priority of U.S. Provisional Patent Application Ser. No. 62/942,137, filed Dec. 1, 2019, which is herein incorporated by reference in its entirety.

FIELD OF THE INVENTION

The invention related generally to distance measurement, and relates more particularly to enhancing triangulation-based three-dimensional distance measurements with time of flight (TOF) information.

BACKGROUND

U.S. patent applications Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include light projecting systems (e.g., comprising lasers, diffractive optical elements, and/or other cooperating components) which project beams of light in a wavelength that is substantially invisible to the human eye (e.g., infrared) into a field of view. The beams of light spread out to create a pattern of points (dots, dashes, or other the like) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the points) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

In one example, a method performed by a processing system including at least one processor includes causing a light projecting system of a distance sensor to project a pattern of light onto an object, wherein the pattern of light comprises a plurality of points of light that collectively form the pattern, causing a light receiving system of the distance sensor to acquire an image of the pattern of light projected onto the object, detecting an image position of a first point of light of the plurality of points of light on an imaging sensor of the light receiving system, calculating a first estimated distance and a second estimated distance between the distance sensor and the object, based on the image position of the first point of light, causing the light projecting system of the distance sensor to emit a pulse of light toward the object, causing the light receiving system to acquire an image of a portion of the pulse of light that is reflected by the object, calculating a third estimated distance between the distance sensor and the object, based on a time of flight of the pulse of light, and calculating a fourth estimated distance between the distance sensor and the object, based on the first estimated distance, the second estimated distance, and the third estimated distance.

In another example, a non-transitory machine-readable storage medium is encoded with instructions executable by a processing system including at least one processor. When executed, the instructions cause the processing system to perform operations including causing a light projecting system of a distance sensor to project a pattern of light onto an object, wherein the pattern of light comprises a plurality of points of light that collectively form the pattern, causing a light receiving system of the distance sensor to acquire an image of the pattern of light projected onto the object, detecting an image position of a first point of light of the plurality of points of light on an imaging sensor of the light receiving system, calculating a first estimated distance and a second estimated distance between the distance sensor and the object, based on the image position of the first point of light, causing the light projecting system of the distance sensor to emit a pulse of light toward the object, causing the light receiving system to acquire an image of a portion of the pulse of light that is reflected by the object, calculating a third estimated distance between the distance sensor and the object, based on a time of flight of the pulse of light, and calculating a fourth estimated distance between the distance sensor and the object, based on the first estimated distance, the second estimated distance, and the third estimated distance.

In another example, an apparatus includes a processing system including at least one processor and a non-transitory machine-readable storage medium encoded with instructions executable by the processing system. When executed, the instructions cause the processing system to perform operations including causing a light projecting system of a distance sensor to project a pattern of light onto an object, wherein the pattern of light comprises a plurality of points of light that collectively form the pattern, causing a light receiving system of the distance sensor to acquire an image of the pattern of light projected onto the object, detecting an image position of a first point of light of the plurality of points of light on an imaging sensor of the light receiving system, calculating a first estimated distance and a second estimated distance between the distance sensor and the object, based on the image position of the first point of light, causing the light projecting system of the distance sensor to emit a pulse of light toward the object, causing the light receiving system to acquire an image of a portion of the pulse of light that is reflected by the object, calculating a third estimated distance between the distance sensor and the object, based on a time of flight of the pulse of light, and calculating a fourth estimated distance between the distance sensor and the object, based on the first estimated distance, the second estimated distance, and the third estimated distance.

BRIEF DESCRIPTION OF THE DRAWINGS

FIG. 1A is an example chart illustrating the relationship between the image position of a point of light on a distance sensor's imaging sensor and object distance;

FIG. 1B is an example chart illustrating the relationship between object distance and distance measurement accuracy for time of flight based distance calculations;

DETAILED DESCRIPTION

Figure 2:
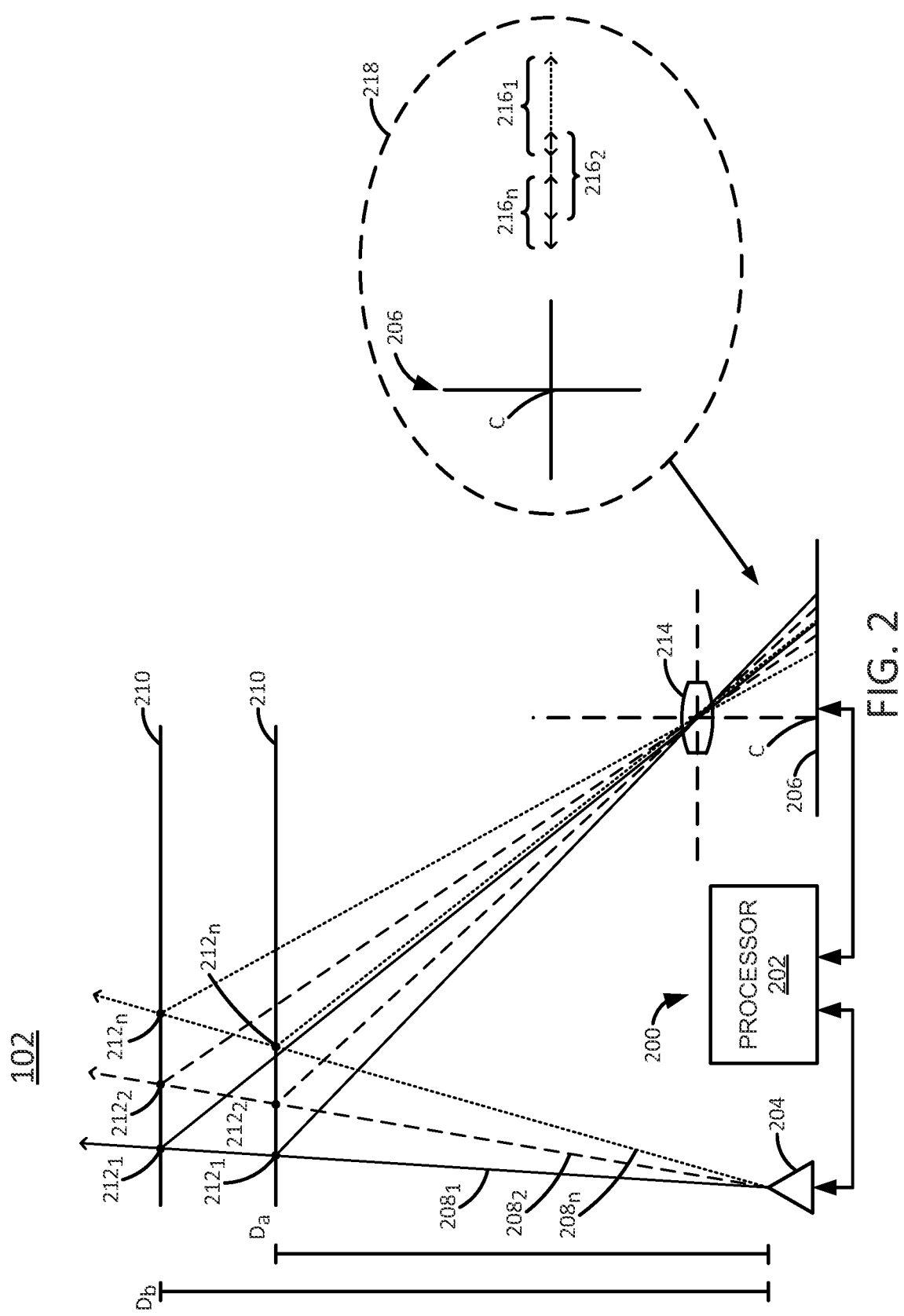
FIG. 2, for instance, illustrates a simplified example of a distance sensor for measuring the distance to an object.

The present disclosure broadly describes an apparatus, method, and non-transitory computer-readable medium for enhancing triangulation-based three-dimensional distance measurements with time of flight (TOF) information. As discussed above, distance sensors such as those described in U.S. patent applications Ser. Nos. 14/920,246, 15/149,323, and 15/149,429 determine the distance to an object (and, potentially, the shape and dimensions of the object) by projecting beams of light that spread out to create a pattern of points (e.g., dots, dashes, or the like) in a field of view that includes the object. The beams of light may be projected from one or more laser light sources which emit light of a wavelength that is substantially invisible to the human eye, but which is visible to an appropriate detector (e.g., of the light receiving system). The three-dimensional distance to the object may then be calculated based on the appearance of the pattern to the detector, using triangulation techniques.

Three-dimensional distance measurement by triangulation has proven to be highly accurate at close range, and is therefore useful for applications such as facial authentication (e.g., authenticating an individual as an authorized user of a device or service based on matching of the individual's facial features to facial features of an authorized user). At longer distances, however, triangulation may be more prone to error due to the difficulty in identifying individual points of light (i.e., identifying correspondences between points of light in the pattern and the beams that created the points, which are necessary for determining the positional relationships of the points of light).

For instance, as discussed above, the image positions (i.e., the positions of the light reflected by the points on an imaging sensor) of the individual points of light in a pattern that is projected into an object may vary based on the distance to the object. As an example, the points of light may appear closer to each other when the object is closer to the sensor, and may appear further away from each other when the object is further away from the sensor. The range of potential image positions for an individual point of light may be referred to as the point of light's "trajectory," and the trajectory tends to be fixed. As the number of points of light in a pattern increases, so does the likelihood that the trajectories of the individual points of light will overlap, making it more difficult to determine which point of light corresponds to which beam projected by the distance sensor. If the beam to which the point of light corresponds cannot be determined, then distance measurement by triangulation becomes more difficult.

FIG. 1A is an example chart 100 illustrating the relationship between the image position of a point of light on a distance sensor's imaging sensor and object distance (i.e., the distance from the distance sensor to the object whose distance is being measured). In particular, the x axis of the chart 100 plots the positional resolution of the point of light, while the y axis of the chart 100 plots the distance resolution. As discussed above, knowing the relationship between point image position and object distance is key to being able to calculate object distance using triangulation techniques.

As can be seen in FIG. 1A, the trajectory (or range within which the image position of a point may move) decreases as the distance to the object increases. This means that, for triangulation-based distance measurement techniques, distance measurements can be made at high resolution for longer distances, because the amount of movement of the image position is larger in the near range.

FIG. 1B is an example chart 102 illustrating the relationship between object distance and distance measurement accuracy for time of flight based distance calculations. In particular, the x axis of the chart 102 plots the time measurement resolution (i.e., round trip time of flight), while they axis of the chart 102 plots the distance resolution. As can be seen from FIG. 1B, the ranging resolution (or accuracy) for time of flight-based distance measurement calculations is constant for any object distance.

Thus, when reviewing FIG. 1A and FIG. 1B together, it can be seen that the distance measurement resolution of triangulation-based distance measurement techniques far exceeds the distance measurement resolution of time of flight-based distance measurement techniques, at least up to a certain object distance.

Examples of the present disclosure make use of time of flight (TOF)-based distance measurement techniques to augment triangulation-based three-dimensional distance measurements for improved accuracy. TOF typically works by projecting modulated light onto an object and tracking the time that it takes the projected light to return as reflected light; the distance to the object can be calculated as a function of the time elapsed between emission of the projected light and imaging of the reflected light on a sensor. In this way, distance can be measured at a certain resolution, regardless of distance. Although this resolution is typically too coarse for applications such as facial authentication, which rely on a high level of detail, it can be useful in confirming the results of a triangulation-based measurement.

In particular, in one example, a distance measurement calculation made using triangulation-based techniques may identify a point of light in a projection pattern that is detected within a region of the projection pattern where two adjacent trajectories overlap. Using triangulation-based distance measurement techniques alone, it may be difficult to determine to which trajectory (and hence, which projected beam) that point of light belongs. However, by augmenting with a distance measurement calculation based on time of flight, it may be possible to discern the trajectory to which the point of light belongs.

FIG. 2, for instance, illustrates a simplified example of a distance sensor 200 for measuring the distance to an object 210. As illustrated, the distance sensor 200 generally comprises a processor 202, a light projecting system including a plurality of projection points including at least a first projection point 204, and a light receiving system 206 including at least an imaging sensor 206 and a lens 214 of a camera.

The projection point 204 may comprise a plurality of components, including a light source and a diffractive optical element. The light source may comprise a laser light source that is capable of emitting light in a wavelength that is substantially invisible to the human eye (e.g., an infrared wavelength). The light source may emit a single beam of light that is split, by the diffractive optical element, into a plurality of beams of light that fan out from a common central point or origin.

As illustrated, the projection point 204 may project the plurality of beams $208_1$-$208_n$ of light (hereinafter individually referred to as a "beam 208" or collectively referred to as "beams 208") onto an object 210. When the beams 208 are incident upon the object 210, this creates a plurality of points of light $212_1$-$212_n$ (hereinafter individually referred to as a "point 212" or collectively referred to as "points 212"), i.e., one point of light per beam 208, on the object 210. The points 212 of light collectively form a predefined pattern (such as a grid) whose dimensions are known.

The distance from the distance sensor 200 to the object 210 may vary. FIG. 2 shows the object 210 at a first distance $D_a$ and a second distance $D_b$. As shown, the points 212 of light may be incident upon the object 210 at either distance $D_a$ or $D_b$; however, changing the distance will change the appearance of the pattern created by the points 212 of light as discussed above. In particular, the position of a point's reflected image on the imaging sensor 206 will vary as shown.

Inset 218 shows how the trajectories $216_1$-$216_n$ (hereinafter individually referred to as a "trajectory 216" or collectively referred to as "trajectories 216") corresponding to the points $212_1$-$212_n$ overlap on the surface of the imaging sensor. The center of the imaging sensor is designated as C for reference. Due to the overlap of the trajectories 216, a given point 212 of light may appear on a location on the imaging sensor 206 that is covered by two adjacent and overlapping trajectories 216, making it difficult to determine, with certainty, to which trajectory 216 (and hence, to which beam 208) the given point 212 belongs.

Figure 3:
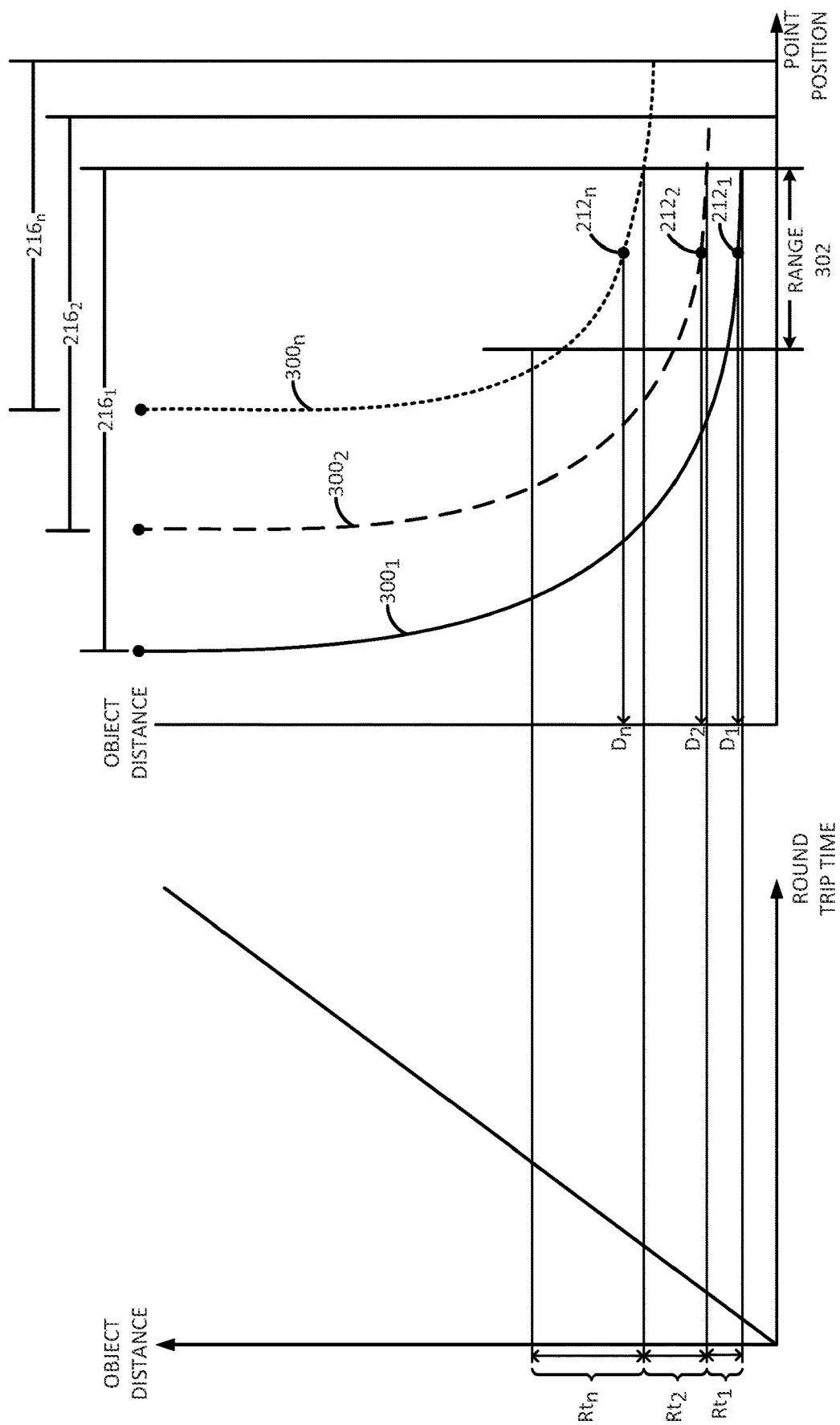
FIG. 3 is a schematic diagram illustrating the relationship between the image position of a point and the object distance when the trajectories overlap, and further illustrating how ranging results obtained via time of flight-based measurement techniques can be obtained simultaneously with ranging results obtained via triangulation-based measurement techniques.

FIG. 3 is a schematic diagram illustrating the relationship between the image position of a point 212 and the object distance D when the trajectories 216 overlap, and further illustrating how ranging results obtained via time of flight-based measurement techniques can be obtained simultaneously with ranging results obtained via triangulation-based measurement techniques.

FIG. 3 shows a plurality of image position-object distance curves similar to that illustrated in FIG. 1A, but for the points 212 of light illustrated in FIG. 2. For instance, curve $300_1$ corresponds to point $212_1$, curve $300_2$ corresponds to point $212_2$, and curve $300_n$ corresponds to point $212_n$. The curves $300_1$-$300_n$ may be individually referred to as a "curve 300" of collectively referred to as "curves 300." The interval or distance between the curves 300 is determined by the angular interval between the points 212 and corresponds to the range 302.

Rt in FIG. 3 represents the resolution of the time of flight-based measurements. More specifically, Rt indicates that, for the closest image position specified, that when the object (e.g., object 210) is a distance Rt away from the distance sensor, the image position moves by Rt. Thus, $Rt_1$ indicates the resolution for the point $212_1$, $Rt_2$ indicates the resolution for the point $212_2$, and $Rt_n$ indicates the resolution for the point $212_n$.

The trajectories 216 of the points 212 overlap as illustrated. Thus, when a given point of light is detected at a position P, the object distance that is calculated will differ depending on whether the given point of light belongs to the trajectory $216_1$, $216_2$, or $216_n$. On the other hand, since the object distance calculated using time of flight techniques at position P is already known, this knowledge can help to identify to which trajectory 216 the given point of light belongs. Furthermore, since the resolution of the time of flight-based measurements is Rt, the object distances for the points 212 can be reliably determined with the resolution of the time of flight.

Figure 4:
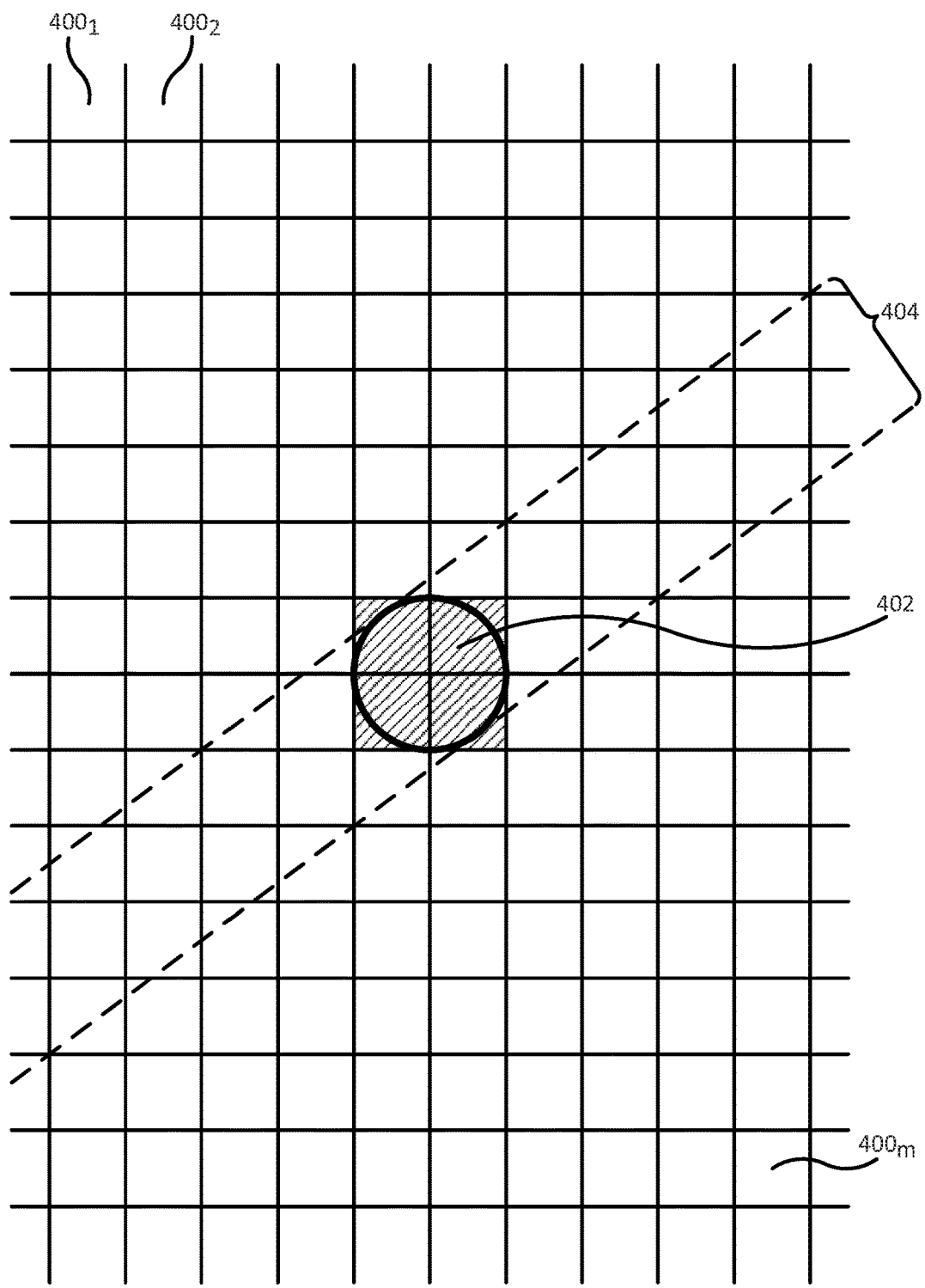
FIG. 4 illustrates an example of the imaging sensor of FIG. 2 in greater detail.

FIG. 4 illustrates an example of the imaging sensor 206 of FIG. 2 in greater detail. More particularly, FIG. 4 shows the relationship between image position and time of flight detection position on the imaging sensor 206. As illustrated, the imaging sensor 206 comprises a plurality of pixels $400_1$-$400_m$ (hereinafter individually referred to as a "pixel 400" or collectively as "pixels 400") arranged in a grid or matrix. Each pixel 400 may include, for example, a photodetector, and may further include a lens (e.g., a microlens) to focus reflected light onto the photodetector and a filter to allow specific wavelengths of light to pass through to the photodetector.

As illustrated, a point of light 402 may be imaged onto the imaging sensor 206. The position of the point of light 402 (as determined by a triangulation-based measurement technique) may overlap one or more of the pixels 400 of the imaging sensor 206. In FIG. 4, the shaded pixels 400 represent the time of flight detection position of the point 402, while the circular outline represents the image position of the point 402 as detected using triangulation-based measurement techniques. A trajectory 404 to which the point 402 belongs is also illustrated. In one example, the point 402 belonging to the trajectory 404 may be imaged anywhere on the imaging sensor 206 falling within the trajectory 404, depending upon the distance from the distance sensor to the object.

Figure 5:
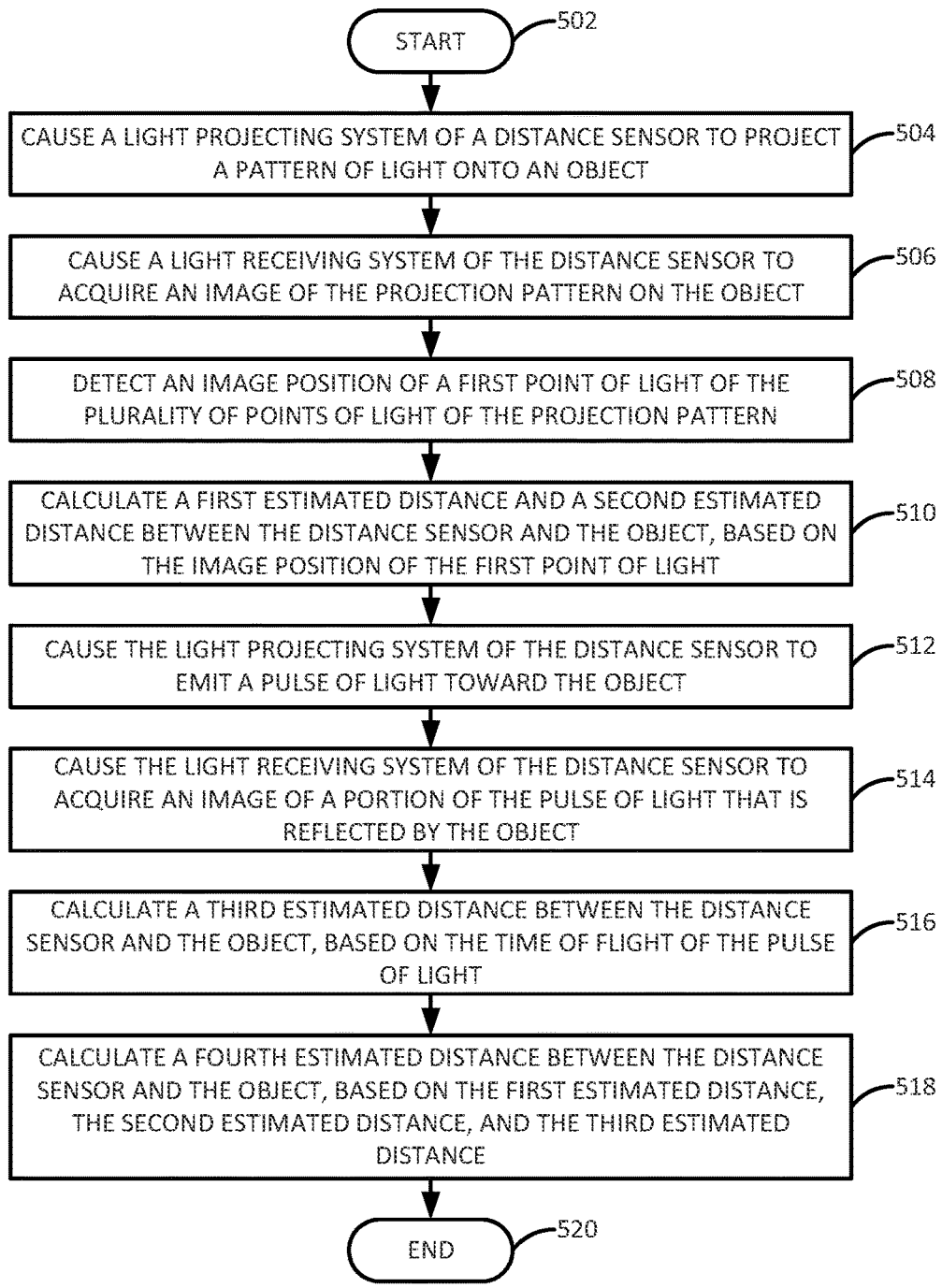
FIG. 5 is a flow diagram illustrating an example method for calculating the distance to an object, according to examples of the present disclosure.

FIG. 5 is a flow diagram illustrating an example method 500 for calculating the distance to an object, according to examples of the present disclosure. The method 500 may be performed, for example, by a processing system including at least one processor, such as the processing system of a distance sensor. For the sake of example, the method 500 is described as being performed by a processing system.

The method 500 may begin in step 502. In step 504, the processing system may cause a light projecting system of a distance sensor to project a pattern of light onto an object, wherein the pattern of light comprises a plurality of points of light that collectively form the pattern. For instance, the processing system may send an electronic signal to the light projecting system, where the electronic signal encodes an instruction. As discussed above, the light may be of a wavelength that is substantially invisible to the human eye, but that is detectable by an imaging sensor of the distance sensor (e.g., infrared light).

The pattern of light may be created by a plurality of beams projected by the distance sensor's light projecting system. The plurality of beams may project the plurality of points of light onto the object, where the plurality of points of light collectively forms the pattern of light, or a "projection pattern." In one example, the plurality of points of light may be arranged into a grid pattern comprising a plurality of rows and a plurality of columns.

In a further example, the arrangement of rows and columns may be staggered. For instance the rows may be arranged so that the points of light of every other row are aligned or collinear along imaginary lines that pass through the centers of the points of light in they or vertical direction. Conversely the points of light in any two immediately adjacent rows will not be aligned (e.g., there will not be an imaginary line in the y or vertical direction that passes through the centers of the points of light of both rows).

Similarly, the columns may be arranged so that the points of light of every other column are aligned or collinear along imaginary lines that pass through the centers of the points of light in the x or horizontal direction. Conversely the points of light of any two immediately adjacent columns will not be aligned (e.g., there will not be an imaginary line in the x or horizontal direction that passes through the centers of the points of light of both columns).

In step 506, the processing system may cause a light receiving system of the distance sensor to acquire an image of the projection pattern on the object. For instance, the processing system may send an electronic signal to the light receiving system, where the electronic signal encodes an instruction. As discussed above, although the projection pattern (e.g., the light forming the projection pattern) may be invisible to the human eye, it may be visible to an image sensor of the light receiving system.

In step 508, the processing system may detect an image position of a first point of light of the plurality of points of light on an imaging sensor of the light receiving system. Detecting the image position of the first point of light may include determining a first beam projected by a projection point of the light projecting system (where the first beam is one of a plurality of beams projected from the projection point) that corresponds to (i.e., produced) the first point of light.

In one example, detecting the image position of the first point of light may include determining that the image position of first point of light is located in a region of the imaging sensor where a first trajectory and a second trajectory overlap. Thus, it may be unclear from the image acquired in step 206 to which trajectory (and hence, which beam of the plurality of beams) the first point of light belongs.

For example, consider a point of light at position P that falls within the area where the trajectories $216_1$, $216_2$, and $216_n$ overlap in FIG. 2. The point P could potentially be identified as a point $P_1$ on trajectory $216_1$, a point P2 on trajectory $216_2$, or a point $P_n$ on trajectory $216_n$. The calculated object distance will be different depending on which point $P_1$, $P_2$, or $P_n$ is determined to be the point P (i.e., the object distance will be $D_1$ for the point $P_1$, $D_2$ for the point $P_2$, and $D_n$ for the point $P_n$).

In step 510, the processing system may calculate a first estimated distance and a second estimated distance between the distance sensor and the object, based on the image position of the first point of light. For instance, the processing system may use a triangulation technique to calculate the first estimated distance and the second estimated distance. As an example, the distance may be calculated in any of the manners discussed in U.S. patent applications Ser. Nos. 14/920,246, 15/149,323, and 15/149,429.

In one example, the first estimated distance may be calculated based on the assumption that the first trajectory corresponds to the first point of light, while the second estimated distance may be calculated based on the assumption that the second trajectory corresponds to the second point of light. Thus, a triangulation-based distance measurement may be calculated for each trajectory that overlaps the location of the first point of light on the imaging sensor. For instance, following the example above for the point P, depending on which of the trajectories is identified as corresponding to the point P, the first estimated distance may be calculated as $D_1$, $D_2$, or $D_3$.

In step 512, the processing system may cause the light projecting system of the distance sensor to emit a pulse of light toward the object. For instance, the processing system may send an electronic signal to the light projecting system, where the electronic signal encodes an instruction. As discussed above, the light may be of a wavelength that is substantially invisible to the human eye, but that is detectable by the imaging sensor of the distance sensor (e.g., infrared light). In one example, step 512 is performed simultaneously with step 504.

In step 514, the processing system may cause the light receiving system of the distance sensor to acquire an image of a portion of the pulse of light that is reflected by the object. For instance, the processing system may send an electronic signal to the light receiving system, where the electronic signal encodes an instruction. As discussed above, although the pulse of light (and the portion of the pulse of light that is reflected) may be invisible to the human eye, it may be visible to the image sensor of the light receiving system. In one example, step 514 is performed simultaneously with step 506.

In step 516, the processing system may calculate a third estimated distance between the distance sensor and the object, based on the time of flight of the pulse of light. For instance, the processing system may calculate the third estimated distance based on the time elapsed between the time when the light projecting system emits the pulse of light and the time when the imaging sensor of the light receiving system detects the portion of the pulse of light that is reflected by the object. For instance, for a point of light at position P on the imaging sensor, the second estimated distance may be calculated as Dt(P).

In step 518, the processing system may calculate a fourth estimated distance between the distance sensor and the object, based on the first estimated distance, the second estimated distance, and the third estimated distance. In particular, the third estimated distance, which was calculated using a time of flight-based distance measurement technique, may be used to determine which of the first estimated distance and the second estimated distance is correct (e.g., matches the third estimated distance within some threshold tolerance or is closer to the third estimated distance). For instance, referring back to FIG. 4, if the point 402 represents the first point of light, then the distance measurement for the pixels 400 surrounding the point 402 may be adopted as the distance measurement for the point 402. Whichever of the first estimated distance and the second estimated distance is determined to be correct based on the third estimated distance may then be output or stored as the distance from the distance sensor to the object.

The method 500 may end in step 520.

It should be noted that although not explicitly specified, some of the blocks, functions, or operations of the method 500 described above may include storing, displaying and/or outputting for a particular application. In other words, any data, records, fields, and/or intermediate results discussed in the method 500 can be stored, displayed, and/or outputted to another device depending on the particular application. Furthermore, blocks, functions, or operations in FIG. 5 that recite a determining operation, or involve a decision, do not imply that both branches of the determining operation are practiced. In other words, one of the branches of the determining operation may not be performed, depending on the results of the determining operation.

Figure 6:
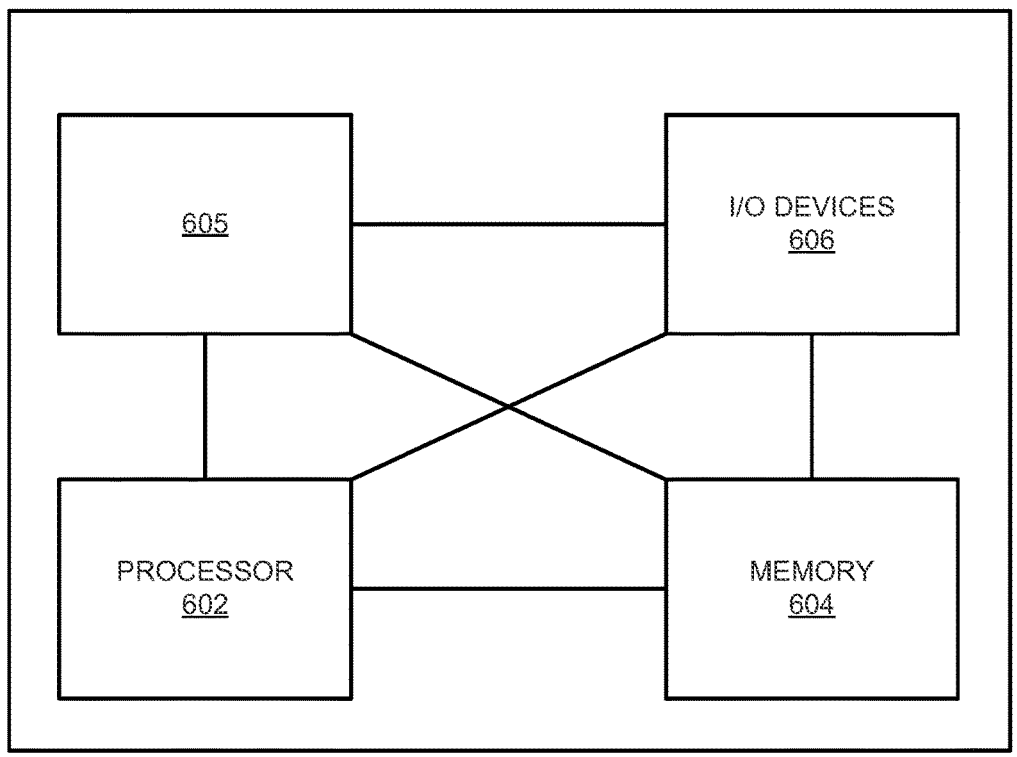
FIG. 6 depicts a high-level block diagram of an example electronic device for calculating the distance from a sensor to an object.

FIG. 6 depicts a high-level block diagram of an example electronic device 600 for calculating the distance from a sensor to an object. As such, the electronic device 600 may be implemented as a processor of an electronic device or system, such as a distance sensor.

As depicted in FIG. 6, the electronic device 600 comprises a hardware processor element 602, e.g., a central processing unit (CPU), a microprocessor, or a multi-core processor, a memory 604, e.g., random access memory (RAM) and/or read only memory (ROM), a module 605 for calculating the distance from a sensor to an object, and various input/output devices 606, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 600 may employ a plurality of processor elements. Furthermore, although one electronic device 600 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 600 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 605 for calculating the distance from a sensor to an object, e.g., machine readable instructions can be loaded into memory 604 and executed by hardware processor element 602 to implement the blocks, functions or operations as discussed above in connection with the method 500. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
    causing, by a processing system of a distance sensor, a light projecting system of the distance sensor to project a pattern of light onto an object, wherein the pattern of light comprises a plurality of points of light that collectively form the pattern;
    causing, by the processing system, a light receiving system of the distance sensor to acquire an image of the pattern of light projected onto the object;
    detecting, by the processing system, an image position of a first point of light of the plurality of points of light on an imaging sensor of the light receiving system;
    calculating, by the processing system, a first estimated distance and a second estimated distance between the distance sensor and the object, based on the image position of the first point of light;
    causing, by the processing system, the light projecting system of the distance sensor to emit a pulse of light toward the object;
    causing, by the processing system, the light receiving system to acquire an image of a portion of the pulse of light that is reflected by the object;
    calculating, by the processing system, a third estimated distance between the distance sensor and the object, based on a time of flight of the pulse of light; and
    calculating, by the processing system, a fourth estimated distance between the distance sensor and the object, based on the first estimated distance, the second estimated distance, and the third estimated distance.

2. The method of claim 1, wherein the calculating the first estimated distance and the second estimated distance comprises:
    identifying, by the processing system, a first trajectory and a second trajectory that overlap in a location of the image position;
    calculating, by the processing system, the first estimated distance based on an assumption that the point of light belongs to the first trajectory; and
    calculating, by the processing system, the second estimated distance based on an assumption that the point of light belongs to the second trajectory.

3. The method of claim 2, wherein the first trajectory comprises a first range of potential range of image positions of a point of light of the plurality of points of light belonging to the first trajectory, and the second trajectory comprises a second range of potential image positions of a point of light of the plurality of points of light belonging to the first trajectory.

4. The method of claim 3, wherein the first estimated distance and the second estimated distance are calculated using triangulation.

5. The method of claim 3, wherein the calculating the fourth distance comprises:
    determining, by the processing system that the first estimated distance is closer to the third estimated distance than the second estimated distance; and
    setting, by the processing system, the fourth estimated distance equal to the first estimated distance.

6. The method of claim 1, wherein the causing the light projecting system to project the pattern of light is performed simultaneously with the causing the light projecting system to emit the pulse of light.

7. The method of claim 6, wherein the causing the light receiving system to acquire the image of the projection pattern is performed simultaneously with the causing the light receiving system to acquire the image of the portion of the pulse of light.

8. The method of claim 1, wherein the plurality of points of light and the pulse of light comprise light of a wavelength that is invisible to a human eye.

9. The method of claim 8, wherein the plurality of points of light and the pulse of light comprise infrared light.

10. The method of claim 1, wherein the pattern of light comprises a predefined pattern having known dimensions.

11. A non-transitory machine-readable storage medium encoded with instructions executable by the processing system including at least one processor, wherein, when executed by the processing system, the instructions cause the processing system to perform operations, the operations comprising:
  causing a light projecting system of a distance sensor to project a pattern of light onto an object, wherein the pattern of light comprises a plurality of points of light that collectively form the pattern;
  causing a light receiving system of the distance sensor to acquire an image of the pattern of light projected onto the object;
  detecting an image position of a first point of light of the plurality of points of light on an imaging sensor of the light receiving system;
  calculating a first estimated distance and a second estimated distance between the distance sensor and the object, based on the image position of the first point of light;
  causing the light projecting system of the distance sensor to emit a pulse of light toward the object;
  causing the light receiving system to acquire an image of a portion of the pulse of light that is reflected by the object;
  calculating a third estimated distance between the distance sensor and the object, based on a time of flight of the pulse of light; and
  calculating a fourth estimated distance between the distance sensor and the object, based on the first estimated distance, the second estimated distance, and the third estimated distance.

12. The non-transitory machine-readable storage medium of claim 11, wherein the calculating the first estimated distance and the second estimated distance comprises:
  identifying a first trajectory and a second trajectory that overlap in a location of the image position;
  calculating the first estimated distance based on an assumption that the point of light belongs to the first trajectory; and
  calculating the second estimated distance based on an assumption that the point of light belongs to the second trajectory.

13. The non-transitory machine-readable storage medium of claim 12, wherein the first trajectory comprises a first range of potential range of image positions of a point of light of the plurality of points of light belonging to the first trajectory, and the second trajectory comprises a second range of potential image positions of a point of light of the plurality of points of light belonging to the first trajectory, and the first estimated distance and the second estimated distance are calculated using triangulation.

14. The non-transitory machine-readable storage medium of claim 13, wherein the calculating the fourth distance comprises:
  determining, by the processing system that the first estimated distance is closer to the third estimated distance than the second estimated distance; and
  setting, by the processing system, the fourth estimated distance equal to the first estimated distance.

15. The non-transitory machine-readable storage medium of claim 11, wherein the causing the light projecting system to project the pattern of light is performed simultaneously with the causing the light projecting system to emit the pulse of light.

16. The non-transitory machine-readable storage medium of claim 15, wherein the causing the light receiving system to acquire the image of the projection pattern is performed simultaneously with the causing the light receiving system to acquire the image of the portion of the pulse of light.

17. The non-transitory machine-readable storage medium of claim 11, wherein the plurality of points of light and the pulse of light comprise light of a wavelength that is invisible to a human eye.

18. The non-transitory machine-readable storage medium of claim 17, wherein the plurality of points of light and the pulse of light comprise infrared light.

19. The non-transitory machine-readable storage medium of claim 11, wherein the pattern of light comprises a predefined pattern having known dimensions.

20. An apparatus, comprising:
  a processing system; and
  a non-transitory machine-readable storage medium encoded with instructions executable by the processing system, wherein, when executed, the instructions cause the processing system to perform operations, the operations comprising:
    causing a light projecting system of a distance sensor to project a pattern of light onto an object, wherein the pattern of light comprises a plurality of points of light that collectively form the pattern;
    causing a light receiving system of the distance sensor to acquire an image of the pattern of light projected onto the object;
    detecting an image position of a first point of light of the plurality of points of light on an imaging sensor of the light receiving system;
    calculating a first estimated distance and a second estimated distance between the distance sensor and the object, based on the image position of the first point of light;
    causing the light projecting system of the distance sensor to emit a pulse of light toward the object;
    causing the light receiving system to acquire an image of a portion of the pulse of light that is reflected by the object;
    calculating a third estimated distance between the distance sensor and the object, based on a time of flight of the pulse of light; and
    calculating a fourth estimated distance between the distance sensor and the object, based on the first estimated distance, the second estimated distance, and the third estimated distance.

* * * * *